(12) United States Patent
Dalton et al.

(10) Patent No.: US 11,048,603 B2
(45) Date of Patent: Jun. 29, 2021

(54) CRITICAL PATH FAILURE ANALYSIS USING HARDWARE INSTRUCTION INJECTION

(71) Applicant: International Business Machines Corporation, Armonk, NY (US)

(72) Inventors: Sean Dalton, Austin, TX (US); Tony E. Sawan, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 16/419,406

(22) Filed: May 22, 2019

(65) Prior Publication Data
US 2020/0371887 A1 Nov. 26, 2020

(51) Int. Cl.
*G06F 11/00* (2006.01)
*G06F 11/263* (2006.01)
*G06F 11/07* (2006.01)
*G06F 11/22* (2006.01)

(52) U.S. Cl.
CPC ........ *G06F 11/263* (2013.01); *G06F 11/0724* (2013.01); *G06F 11/2242* (2013.01)

(58) Field of Classification Search
CPC ............... G06F 11/263; G06F 11/0724; G06F 11/2242; G06F 11/2236; G06F 11/0721
See application file for complete search history.

(56) References Cited

U.S. PATENT DOCUMENTS

| | | |
|---|---|---|
| 5,459,845 A | 10/1995 | Nguyen et al. |
| 6,106,573 A | 8/2000 | Mahalingaiah et al. |
| 7,243,270 B2 | 7/2007 | Taniguchi et al. |
| 7,685,487 B1 | 3/2010 | Kuo et al. |
| 2003/0004679 A1 | 1/2003 | Tryon, III et al. |

(Continued)

FOREIGN PATENT DOCUMENTS

WO  WO-2011/119949 A1  9/2011

OTHER PUBLICATIONS

Kim et al., *AUDIT: Stress Testing the Automatic Way*, Proceedings of the 2012 45th Annual IEEE/ACM International Symposium on Microarchitecture (MICRO-45) Dec. 2012, pp. 212-223, IEEE Computer Society, Washington, DC, USA, DOI: 10.1109/MICRO. 2012.28.

(Continued)

*Primary Examiner* — Joseph D Manoskey
(74) *Attorney, Agent, or Firm* — Teddi Maranzano

(57) ABSTRACT

Critical path failure analysis using hardware instruction injection may include providing, by an instruction microcontroller, to a plurality of processor cores, one or more test instruction sequences, wherein the instruction microcontroller is coupled to, for each of the plurality of processor cores: a first multiplexor providing an input to an instruction queue, and a second multiplexer receiving an input from the instruction queue and providing an output to an execution pathway; performing, by the instruction microcontroller, based on one or more test instruction sequences, one or more of a scan-in last pass (SLP) analysis or a scan-in cycle offset (SCO) analysis; and determining, based on one or more of the SLP analysis or the SCO analysis, one or more of a critical instruction sequence or a critical component path associated with the plurality of processor cores.

20 Claims, 7 Drawing Sheets

(56) References Cited

U.S. PATENT DOCUMENTS

| | | | | |
|---|---|---|---|---|
| 2003/0126515 | A1* | 7/2003 | Abdo | G06F 11/2242 714/43 |
| 2008/0023700 | A1* | 1/2008 | Gschwind | G01R 31/318569 257/48 |
| 2008/0092005 | A1* | 4/2008 | Huott | G01R 31/318547 714/738 |
| 2009/0193303 | A1 | 7/2009 | Giles et al. | |
| 2010/0287429 | A1* | 11/2010 | Maruyama | G01R 31/318547 714/728 |
| 2013/0031418 | A1* | 1/2013 | Bellofatto | G06F 11/2242 714/40 |
| 2017/0212818 | A1* | 7/2017 | Kapoor | G06F 11/263 |

OTHER PUBLICATIONS

Parulkar et al., *A Scalable, Low Cost Design-For-Test Architecture for UltraSPARC™ Chip Multi-Processors*, Proceedings of the IEEE International Test Conference (TC), Oct. 2002, pp. 726-735, , IEEE Computer Society, Washington, DC, USA, ISBN: 0-7803-7542-4.

Yim et al., *Quantitative Analysis of Long-Latency Failures in System Software*, Proceedings of the 2009 15th IEEE Pacific Rim International Symposium on Dependable Computing (PRDC'09), Nov. 2009, pp. 23-30, IEEE Computer Society, Washington, DC, USA, DOI: 10.1109/PRDC.2009.13.

Dusanapudi et al., *Debugging post-silicon fails in the IBM Power8 bring-up lab*, IBM Journal of Research and Development, vol. 59, Issue 1, Paper 12, Jan./Feb. 2015, 10 pages, IBM Corporation, Riverton, NJ, USA.

Park, *Chapter 2. Post-Silicon Bug Localization in Processors Using IFRA*, Thesis: Post-Silicon Bug Localization in Processors, Mar. 2010, pp. 6-41, Stanford University (online), accessed Feb. 27, 2019, URL: https://stacks.stanford.edu/file/druid:vp361zk0278/Thesis.sbpark84-augmented.pdf.

De Paula et al., *BackSpace: Formal Analysis for Post-Silicon Debug*, Proceedings of the 2008 International Conference on Formal Methods in Computer-Aided Design (FMCAD'08), Article No. 5, Nov. 2008, 10 pages, IEEE Press Piscataway, NJ, USA.

Deorio et al., *Machine Learning-based Anomaly Detection for Post-silicon Bug Diagnosis*, Proceedings of the Conference on Design, Automation and Test in Europe (DATE'13), pp. 491-496, EDA Consortium, San Jose, CA, USA, ISBN: 978-1-4503-2153-2.

\* cited by examiner

CRITICAL PATH FAILURE ANALYSIS USING HARDWARE INSTRUCTION INJECTION

BACKGROUND

Field of the Invention

The field of the invention is data processing, or, more specifically, methods and apparatus for critical path failure analysis using hardware instruction injection.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Many factors may contribute to a processor fail during runtime. Characterizing these factors requires inputs to the processors to be manipulated in order to determine the root cause of the failure. This may require the particular cycle at which a failure occurs to be identified. This may be a time and resource intensive process.

SUMMARY

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
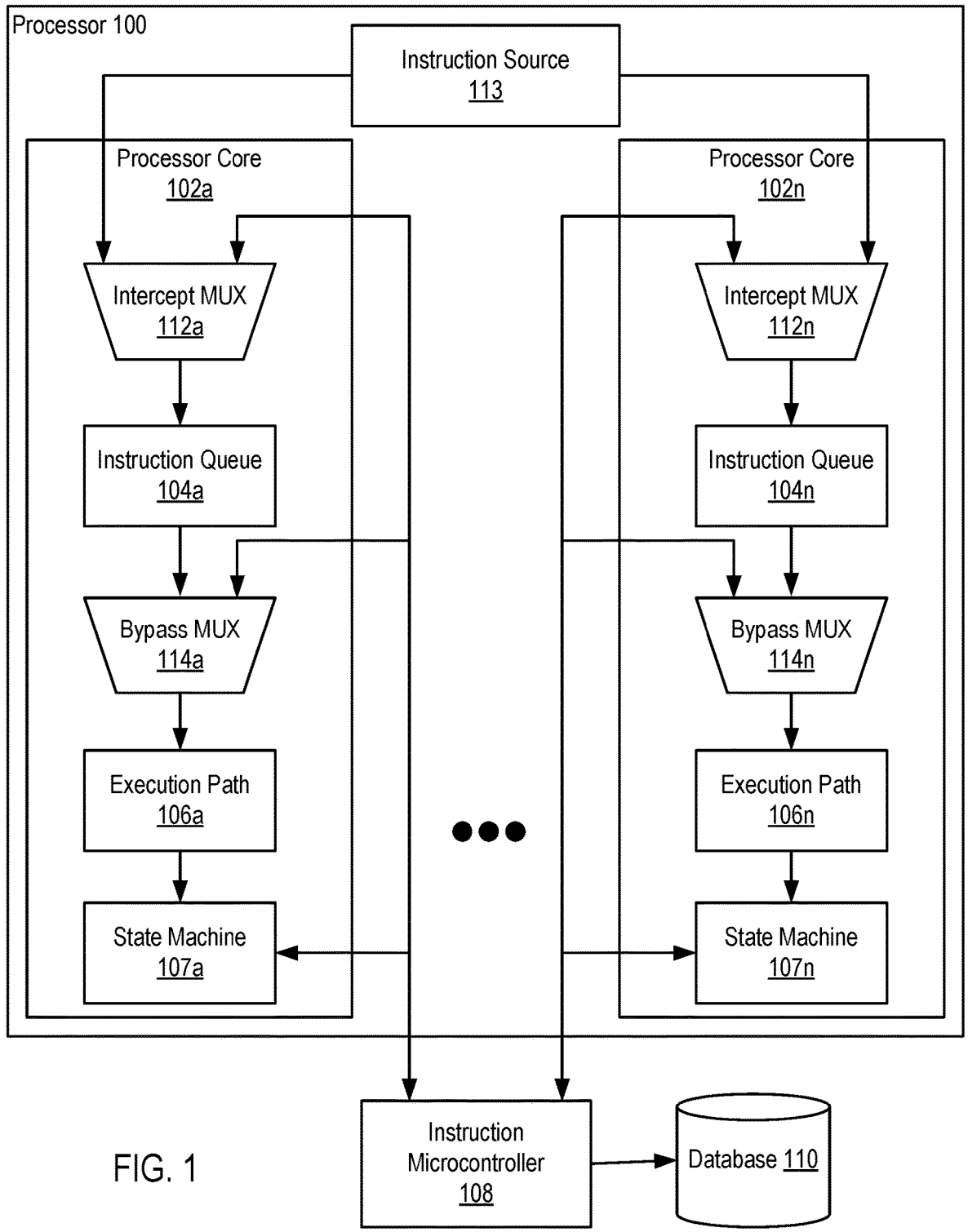
FIG. 1 is a block diagram of an example processor configured for critical path failure analysis using hardware instruction injection.

Exemplary methods, apparatus, and products for critical path failure analysis using hardware instruction injection in accordance with the present invention are described with reference to the accompanying drawings, beginning with FIG. 1. FIG. 1 sets forth a block diagram of a processor 100 configured for critical path failure analysis using hardware instruction injection according to embodiments of the present invention. The processor of FIG. 1 includes a plurality of processor cores 102*a* through 102*n*, collectively referred to as processor cores 102*a-n*. Each processor core 102*a-n* includes a respective instruction queue 104*a* through 104*n* configured to store one or more processor executable instructions. For example, the instruction queues 104*a* may comprise level 1 (L1) cache memory or other memory capable of storing instructions. Each processor core 102*a-n* also comprises a respective execution path 106*a-n* each comprising one or more components configured to execute an instruction (e.g., loaded from an instruction queue 104*a-n*. For example, the execution paths 104*a-n* may each comprise a dispatch network, execution slices, load-store slices, etc. The processor cores 102*a-n* may each also comprise a state machine 107*a-n* indicating a particular state of the respective processor core 102*a-n*. The state machine 107*a-n* may indicate, for example, a state of one or more registers of the processor core 102*a-n*, a state of one or more latches or switches of the processor core 102*a-n*, a state of the instruction queue 104*a-n*, or other attributes. Accordingly, the state machine 107*a-n* may be updated as instructions are loaded to and from the instruction queue 104*a-n* and executed via the execution path 106*a-n*.

Each processor core 102*a-n* is coupled to an instruction microcontroller 108 configured for critical path failure analysis using hardware instruction injection. The instruction microcontroller 108 comprises a microcontroller configured to inject instructions into an instruction data path for a processor core 102*a-n* (e.g., a path for transferring instruction code for execution), and to monitor the states of processor cores 102*a-n* for failure analysis. For example, the instruction microcontroller 108 may determine, for the processor 100, one or more of a critical execution path or a critical component path. A critical execution path comprises a series of one or more instructions that, when executed by a processor core 102*a-n*, causes the executing processor core 102*a-n* to enter a failure state. A critical component path comprises one or more components (e.g., latches, switches, or other components of a processor core 102*a-n*) associated with the failure state. For example, a critical component path may comprise one or more latches that, when triggered, cause the processor core 102*a-n* to enter the failure state.

A processor core 102*a-n* is said to have entered a failure state when the processor core 102*a-n* satisfies one or more criteria indicated in a failure signature. A failure signature may comprise, for example, exceeding a minimum time threshold for the processor core 102*a-n* to provide an output associated with a particular input. A failure signature may also comprise the processor core 102*a-n* providing an incorrect output associated with a particular input. A failure signature may further comprise a state of one or more latches, registers, or other components of the processor core 102*a-n*.

The instruction microcontroller 108 may be in communication with a database 110. The database 110 may store failure signatures. Where the cause of a failure signature is known, the database 110 may also store an indication of a critical instruction path and/or critical component path associated with the failure signature. The database 110 may further store states of processor cores 102*a-n*. The states may be read from or loaded into state machines 107*a-n* by the instruction microcontroller.

In order for the instruction microcontroller 108 to perform critical path failure analysis using hardware instruction injection, the instruction microcontroller 108 may be configured to provide, to the processor cores 102*a-n*, one or more test instruction sequences. The one or more test instructions sequences comprise a plurality of instructions for execution by the processor cores 102*a-n*. The instruction microcontroller 108 may provide the one or more test instruction sequences via an intercept multiplexer (MUX) 112*a-n*. The intercept MUX 112*a-n* accepts, as input, input from the instruction microcontroller 108 and an input from an instruction source 113 (e.g., memory, an instruction prefetch unit, etc.). The intercept MUX 112*a-n* provides, as output, instructions to the instruction queue 104*a-n*. Accordingly, the instruction microcontroller 108 can provide (e.g., inject) instructions into the instruction queue 104*a-n* via the intercept MUX 112*a-n*.

The instruction microcontroller 108 may provide the one or more test instruction sequences via a bypass multiplexer (MUX) 114*a-n*. The bypass MUX 114*a-n* accepts, as input, input from the instruction microcontroller 108 and an input from the instruction queue 104*a-n*. The bypass MUX 114*a-n* provides, as output, instructions to the execution path 106*a-n*. Accordingly, the instruction microcontroller 108 can provide (e.g., inject) instructions into the execution path 106*a-n* via the bypass MUX 114*a-n*, thereby bypassing the instruction queue 104*a-n*.

The instruction microcontroller 108*a-n* may also access state machines 107*a-n* to read a state of a particular processor core 102*a-n*. The instruction microcontroller 108*a-n* may then save the state to the database 110. The instruction microcontroller 108 may also copy a read state to other processor cores 102*a-n*. The processor cores 102*a-n* into which a state is loaded may then proceed with executing test instruction sequences from the copied in state.

The instruction microcontroller 108*a-n* may perform, based on the one or more test instruction sequences, a scan-in last pass (SLP) analysis. An SLP analysis comprises an approach for determining a critical instruction path by iteratively copying a last passing state of a failed processor cores into other passed processor cores until all processor cores have failed. For example, a SLP analysis may comprise repeatedly executing test instruction sequences until a slowest processor core 102*a-n* fails, and copying a last passing state (e.g., a last state of a state machine 107*a-n* saved prior to the corresponding processor core 102*a-n* matching a failure signature) of the slowest processor core into the remaining processor cores 102*a-n* and resuming execution of the test instruction sequences on those remaining processor cores 102*a-n* (e.g., excluding the slowest processor core 102*a-n* from which the state was copied). If all processor cores 102*a-n* are determined to be failing (e.g., matching a failure signature) after executing the test instruction sequences, the test instruction sequences are determined to be a critical instruction sequence. If the test instruction sequences complete execution and one or more of the processor cores 102*a-n* are not failing (e.g., not matching a failure signature), then a new test instruction sequence may be selected and the process resumed.

For example, performing the SLP analysis may comprise determining each of the processor cores 102*a-n* as passing. Performing the SLP analysis may also comprise, until each processor core 102*a-n* is determined to be failing, identifying, from the passing processor cores 102*a-n*, a slowest core. A slowest core is a processor core 102*a-n* having a highest propagation delay or other metric associated with a time to complete one or more tasks. Although each processor core 102*a-n* may be manufactured according to the same specifications and configured to run at a same clock speed, metallurgical variances or other manufacturing variations may introduce some degree of delay and speed difference across the processor cores 102*a-n*. Accordingly, the speed or ranking of each processor core 102*a-n* may be tested and known prior to beginning the SLP analysis.

After identifying the slowest core, a test instruction sequence may then be executed on each of the passing processor cores 102*a-n* until the slowest core matches a failure signature or execution of the test instruction sequence is completed. Executing the test instruction sequence on each of the passing processor cores 102*a-n* may comprise saving, by the instruction microcontroller, a respective state for each of the processor cores 102*a-n* (e.g., at a predefined time interval, at a predefined cycle interval). If the slowest core fails to match a failure signature after executing the test instruction sequence, a new test instruction sequence may be selected as the test instruction sequence. Selecting a new test instruction sequence may comprise selecting the new test instruction sequence as being mutually exclusive of the last executed test instruction sequence. Selecting the new test instruction may also comprise selecting the new test instruction sequence as at least partially overlapping with the last executed test instruction sequence. For example, selecting the new test instruction sequence may comprise incrementing or modifying a starting instruction address and selecting a predefined number of instructions beginning from that starting instruction address. Any of the one or more processor cores 102*a-n* identified as failing may also then be identified as passing and/or their states reset so that execution of the new test instructions sequence may begin.

In response to the slowest core matching the failure signature, the slowest core may then be identified as failing instead of passing (and therefore excluded from future iterations of the passing processor cores). If one or more processor cores are still identified as passing, a last-passing save state (e.g., saved by the instruction microcontroller 108 at a time or cycle interval) is then copied to the one or more processor cores identified as passing. Execution of the test instruction sequence is then resumed (e.g., from the state copied into the processor cores 102*a-n*).

In response to each of the processor cores being identified as failing, the critical instruction sequence may be determined to be the last executed test instruction sequence (e.g., the test instruction sequence that, when executed, caused each of the processor cores 102*a-n* to match a failure signature). The instruction microcontroller 108 may then update the database 110 to indicate the failure signature, the critical instruction sequence, one or more save states (e.g., a last passing save state for a last failing processor core 102*a-n*), etc. Thus, the instruction microcontroller 108 may replicate a failure by loading in a last passing save state for the last failing processor core 102*a-n* and executing the saved critical instruction sequence.

The instruction microcontroller 108*a-n* may perform, based on the one or more test instruction sequences, a scan-in cycle offset (SCO) analysis. A SCO analysis comprises an approach for identifying a critical component path by iteratively executing, based on a last passing save state, a test instruction sequence on a plurality of processor cores 102*a-n* and saving save states for the processor cores 102*a-n* at a cycle interval that converges to a single cycle. The critical component path may then be identified by comparing a last passing save state to a failing save state for the next cycle.

For example, at each iteration, a last passing save state (e.g., a save state corresponding to a processor core 102*a-n* not matching a failure signature and associated with a highest number of executed cycles is loaded into each of the plurality of processor cores 102*a-n* and execution of the test instruction sequence resumes from the last passing save state. For example, the instruction microcontroller 108 may copy the last passing save state into processor cores and inject instructions of the test instruction sequence corresponding to the copied state (e.g., via the intercept mux 112*a-n* and/or bypass mux 114*a-n*). After the cycle interval has converged to a single cycle, the last passing save state of a passing processor core 102*a-n* can be compared to a save state of a failing processor core 102*a-n* (e.g., associated with the next cycle) to identify a critical component path. For example, the critical component path may comprise an latch, switch, or path of components that are in different states across the compared save states. The failure signature, test instruction sequences, critical component path, and/or processor save states may then be saved into the database 110.

Figure 2:
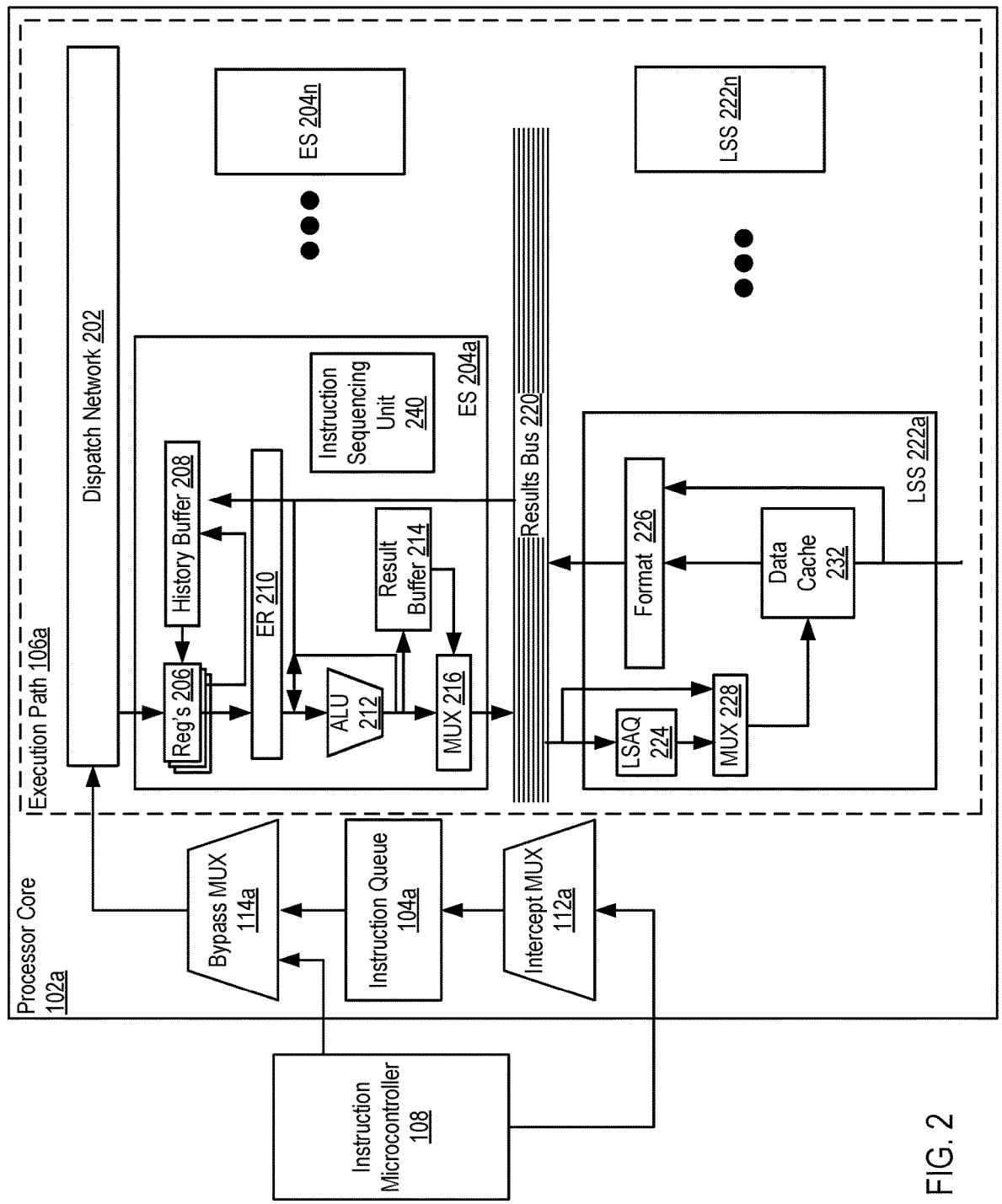
FIG. 2 is a block diagram of an example processor core configured for critical path failure analysis using hardware instruction injection.

For further explanation, therefore, FIG. 2 sets forth a block diagram of an example processor core 102*a* configured for critical path failure analysis using hardware instruction injection. The processor core 102*a* includes an instruction queue 104*a*, as well as an intercept MUX 112 and bypass MUX 114*a* coupled to an instruction microcontroller 108*a*. The processor core 102*a* also includes an execution path 106*a* comprising a dispatch network 202. The dispatch network 202 includes logic configured to dispatch instructions for execution among execution slices.

The execution path 106*a* in the example of FIG. 2 also includes a number of execution slices 204*a*-204*n*. Each execution slice includes general purpose registers 206 and a history buffer 208. The general purpose registers and history buffer may sometimes be referred to as the mapping facility, as the registers are utilized for register renaming and support logical registers.

The general purpose registers 206 are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer 208 may be configured to store many instructions targeting the same logical register. That is, the general purpose register is generally configured to store a single, youngest instruction for each logical register while the history buffer may store many, non-youngest instructions for each logical register.

Each execution slice 204 of the multi-slice processor of FIG. 2 also includes an execution reservation station 210. The execution reservation station 210 may be configured to issue instructions for execution. The execution reservation station 210 may include an issue queue. The issue queue may include an entry for each operand of an instruction. The execution reservation station may issue the operands for execution by an arithmetic logic unit or to a load/store slice 222*a-n* via the results bus 220.

The arithmetic logic unit 212 depicted in the example of FIG. 2 may be composed of many components, such as add logic, multiply logic, floating point units, vector/scalar units, and so on. Once an arithmetic logic unit executes an operand, the result of the execution may be stored in the result buffer 214 or provided on the results bus 220 through a multiplexer 216.

The results bus 220 may be configured in a variety of manners and be of composed in a variety of sizes. In some instances, each execution slice may be configured to provide results on a single bus line of the results bus 220. In a similar manner, each load/store slice may be configured to provide results on a single bus line of the results bus 220. In such a configuration, a multi-slice processor with four processor slices may have a results bus with eight bus lines four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices 222*a*-222*n*. Each load/store slice includes a queue 224, a multiplexer 228, a data cache 232, and formatting logic 226, among other components. The queue receives load and store operations to be carried out by the load/store slice 222. The formatting logic 226 formats data into a form that may be returned on the results bus 220 to an execution slice as a result of a load or store instruction.

The execution path 106*a* in the example of FIG. 2 also includes an instruction sequencing unit 240. While depicted within individual execution slices, in some cases, the instruction sequencing unit may be implemented independently of the execution slices or implemented within dispatch network 202. Instruction sequencing unit 240 may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions, where a program order may be determined by an ITAG. Such issuance of instructions may be referred to as an "out-of-order" execution, and the multi-slice processor may be considered an out-of-order machine.

Figure 3:
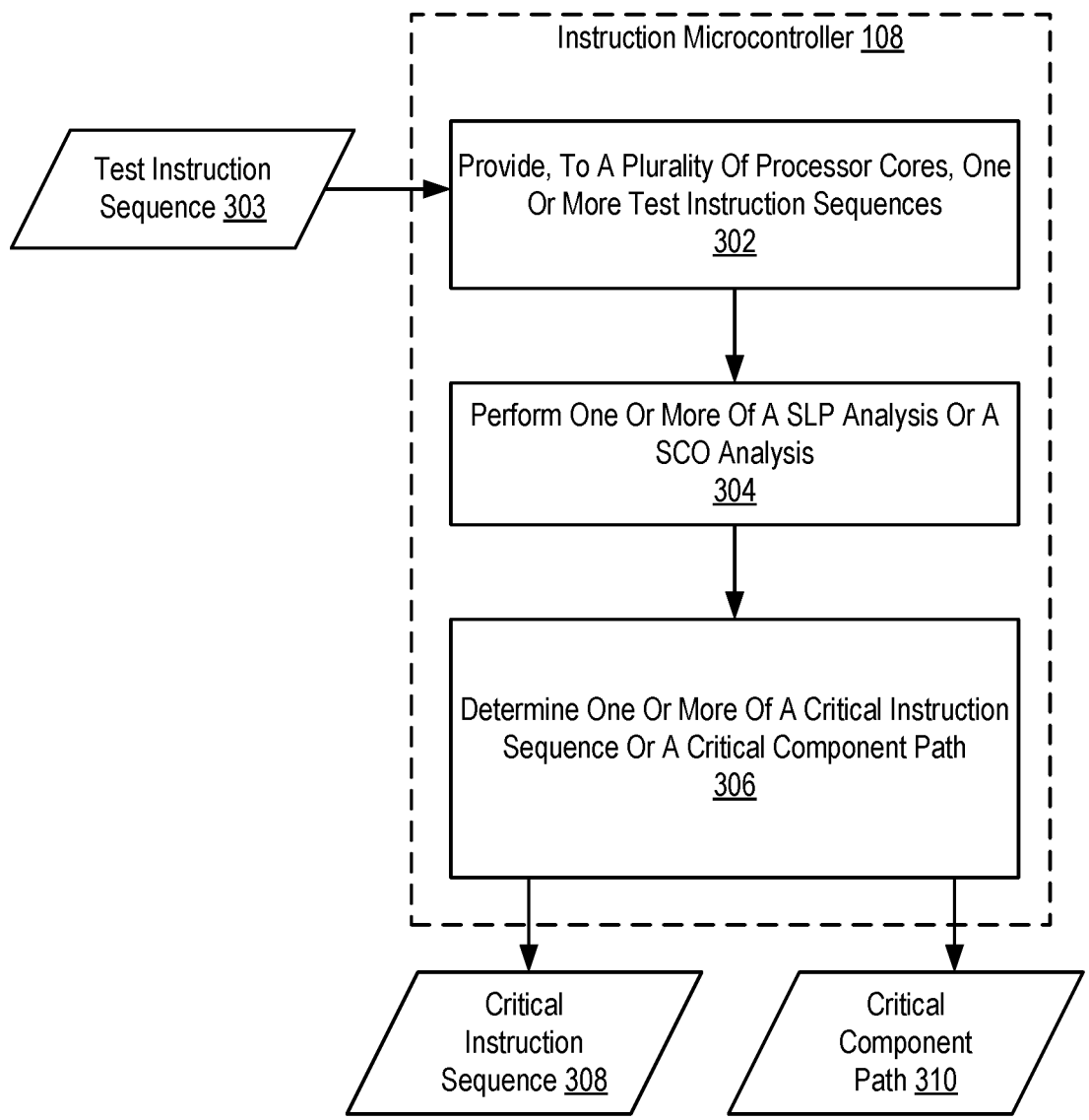
FIG. 3 is a flowchart of an example method for critical path failure analysis using hardware instruction injection.

For further explanation, FIG. 3 sets forth a flow chart illustrating an exemplary method for critical path failure analysis using hardware instruction injection according to embodiments of the present invention that includes providing 302, by an instruction microcontroller (e.g., an instruction microcontroller 108), to a plurality of processor cores (e.g., processor cores 102*a-n*), one or more test instruction sequences 303, wherein the instruction microcontroller is coupled to, for each of the plurality of processor cores: a first multiplexor providing an input to an instruction queue, and a second multiplexer receiving an input from the instruction queue and providing an output to an execution pathway.

The one or more test instructions sequences 303 comprise a plurality of instructions for execution by the processor cores. The instruction microcontroller may provide (e.g., inject) the one or more test instruction sequences via an intercept multiplexer (MUX) 112a-n. The intercept MUX 112a-n accepts, as input, input from the instruction microcontroller and an input from another source of instructions (e.g., memory, an instruction prefetch unit, etc.). The intercept MUX 112a-n provides, as output, instructions to the instruction queue 104a-n.

The instruction microcontroller may provide (e.g., inject) the one or more test instruction sequences 303 via a bypass multiplexer (MUX) 114a-n. The bypass MUX 114a-n accepts, as input, input from the instruction microcontroller and an input from the instruction queue 104a-n. The bypass MUX 114a-n provides, as output, instructions to the execution path 106a-n. Accordingly, the instruction microcontroller can provide (e.g., inject) instructions into the execution path 106a-n via the bypass MUX 114a-n, thereby bypassing the instruction queue 104a-n.

The method of FIG. 3 may further comprise performing 304 (e.g., by the instruction microcontroller 108), based on the one or more test instruction sequences, one or more of a scan-in last pass (SLP) analysis or a scan-in cycle offset (SCO) analysis. A SLP analysis comprises repeatedly executing test instruction sequences 303 until a slowest processor core fails, and copying a last passing state (e.g., a last state of a state machine 107a-n saved prior to the corresponding processor core 102a-n matching a failure signature) of the slowest processor core into the remaining processor cores 102a-n and resuming execution of the test instruction sequences 303 on those remaining processor cores 102a-n (e.g., excluding the slowest processor core 102a-n from which the state was copied). If all processor cores 102a-n are determined to be failing (e.g., matching a failure signature) after executing the test instruction sequences 303, the test instruction sequences are determined to be a critical instruction sequence. If the test instruction sequences complete execution and one or more of the processor cores 102a-n are not failing (e.g., not matching a failure signature), then a new test instruction sequence may be selected and the process resumed.

A SCO analysis comprises iteratively executing a test instruction sequence on a plurality of processor cores 102a-n and saving save states for the processor cores 102a-n at a cycle interval that decreases with each iteration. At each iteration, a last passing save state (e.g., a save state corresponding to a processor core 102a-n not matching a failure signature and associated with a highest number of executed cycles is loaded into each of the plurality of processor cores 102a-n and execution of the test instruction sequence resumes from the last passing save state. For example, the instruction microcontroller 108 may copy the last passing save state into processor cores and inject instructions of the test instruction sequence corresponding to the copied state (e.g., via the intercept mux 112a-n and/or bypass mux 114a-n). After the cycle interval has converged to a single cycle, the last passing save state of a passing processor core 102a-n can be compared to a save state of a failing processor core 102a-n (e.g., associated with the next cycle) to identify a critical component path. For example, the critical component path may comprise a latch, switch, or path of components that are in different states across the compared save states. The failure signature, test instruction sequences, critical component path, and/or processor save states may then be saved into the database 110.

The method of FIG. 3 further comprises determining 306, based on one or more of the SLP analysis or the SCO analysis, one or more of a critical instruction sequence 308 or a critical component path 310. A critical execution path comprises a series of one or more instructions that, when executed by a processor core 102a-n, causes the executing processor core 102a-n to enter a failure state. A critical component path comprises one or more components (e.g., latches, switches, or other components of a processor core 102a-n) associated with the failure state. For example, a critical component path may comprise one or more latches that, when triggered, cause the processor core 102a-n to enter the failure state.

For example, determining one or more of the critical instruction sequence 308 or a critical component path 310 may comprise determining the critical instruction sequence 308 as determined by the SLP analysis. Determining one or more of the critical instruction sequence 308 or a critical component path 310 may comprise determining the critical component path 308 as determined by the SCO analysis.

Figure 4:
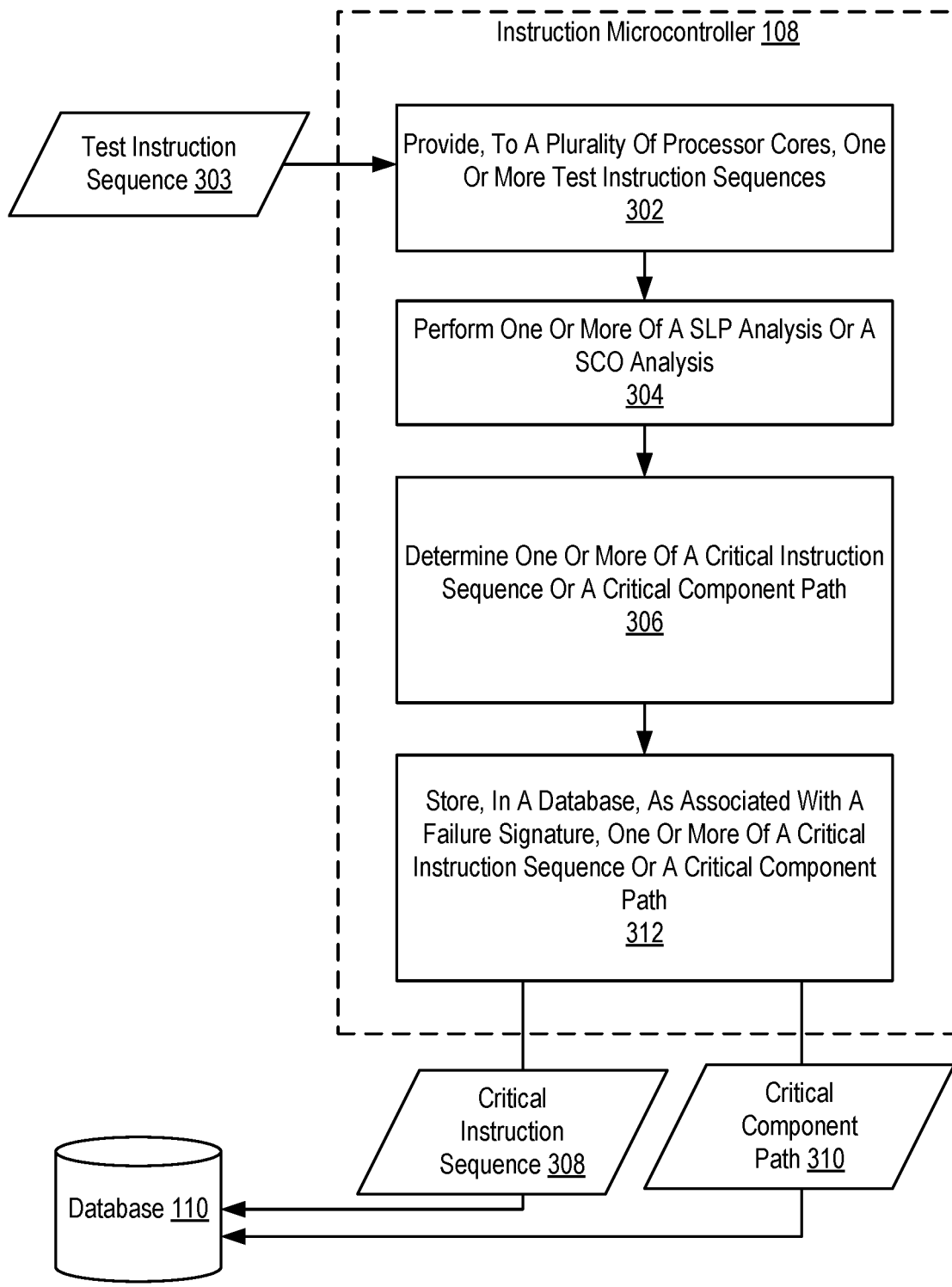
FIG. 4 is a flowchart of an example method for critical path failure analysis using hardware instruction injection.

For further explanation, FIG. 4 shows a flowchart of an example method critical path failure analysis using hardware instruction injection that includes providing 302, by an instruction microcontroller (e.g., an instruction microcontroller 108), to a plurality of processor cores (e.g., processor cores 102a-n), one or more test instruction sequences 303, wherein the instruction microcontroller is coupled to, for each of the plurality of processor cores: a first multiplexor providing an input to an instruction queue, and a second multiplexer receiving an input from the instruction queue and providing an output to an execution pathway; performing 304 one or more of a SLP analysis or a SCO analysis; and determining 306 one or more of a critical instruction sequence 308 or a critical component path 310.

FIG. 4 differs from FIG. 3 in that the method of FIG. 4 further comprises storing 312 (e.g., by the instruction microcontroller 108), in a database 110, as associated with a failure signature, one or more of the critical instruction sequence 308 or the critical component path 310. For example, the critical instruction sequence 308 or the critical component path may be stored in further association with one or more save states of processor cores, or other data.

Figure 5:
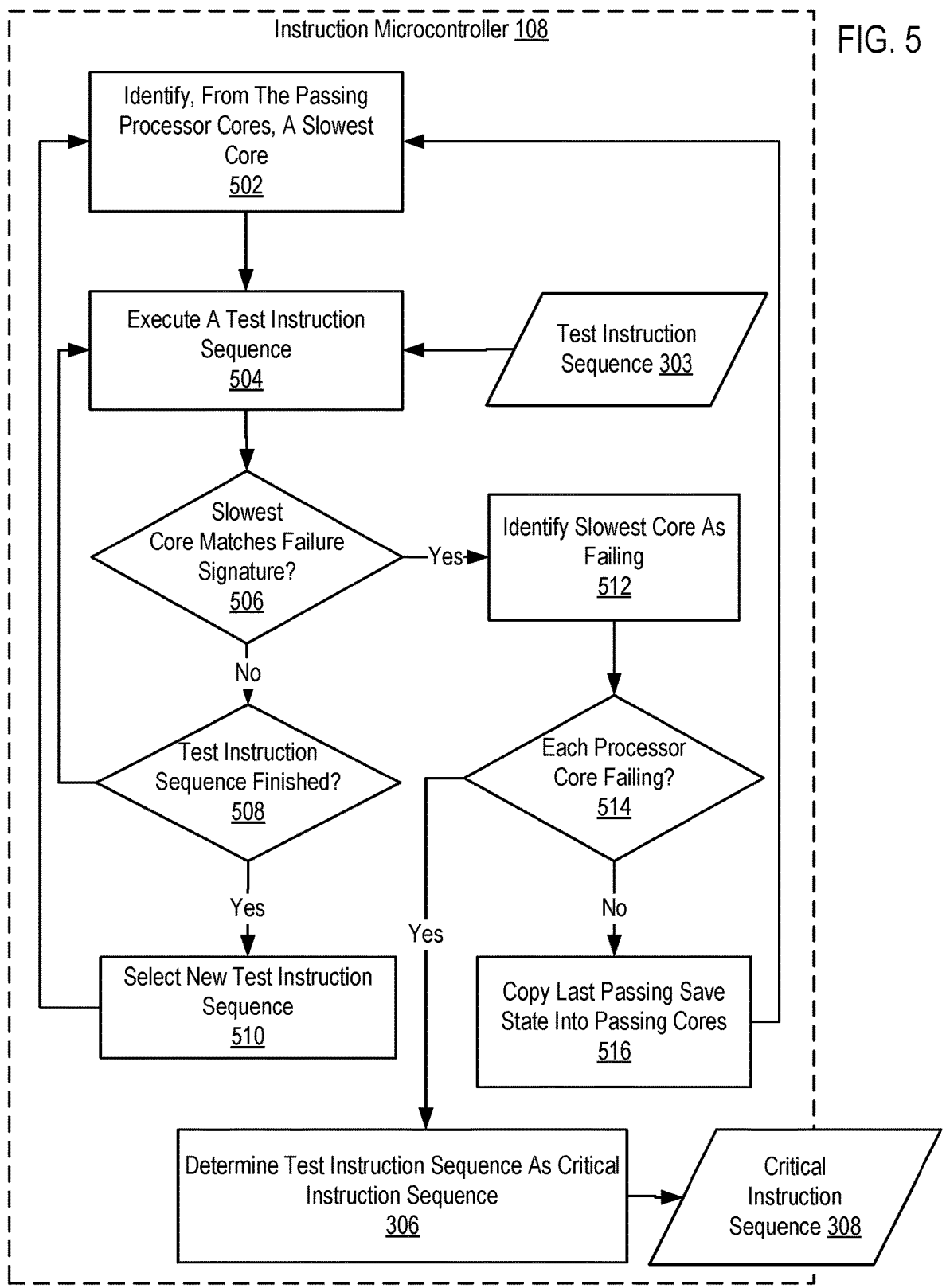
FIG. 5 is a flowchart of an example method for critical path failure analysis using hardware instruction injection.

For further explanation, FIG. 5 shows an example method for critical path failure analysis using hardware instruction injection. Particularly, FIG. 5 shows a method for performing a SLP analysis that includes identifying 502 (e.g., by an instruction microcontroller 108), from one or more passing processor cores (e.g., processor cores not matching a failure signature), a slowest core. A slowest core is a processor core having a highest propagation delay or other metric associated with a time to complete one or more tasks. Although each processor core of a processor may be manufactured according to the same specifications and configured to run at a same clock speed, metallurgical variances or other manufacturing variations may introduce some degree of delay and speed difference across the processor cores. Accordingly, the speed or ranking of each processor core may be tested and/or predefined.

The method of FIG. 5 may further include executing 504 a test instruction sequence 303 on each of the passing processor cores. The test instruction sequence 303 may be loaded from a database, retrieved from a queue, or otherwise accessed for execution. Executing the test instruction sequence 303 on each of the passing processor cores may comprise saving, by the instruction microcontroller 108, a respective state for each of the processor cores (e.g., at a predefined time interval, at a predefined cycle interval). The method of FIG. 5 may further comprise determining 506 if the slowest core fails to match a failure signature (e.g., at a predefined time interval, at a predefined cycle interval). If the slowest core does not match the failure signature, the instruction microcontroller 108 may determine 508 if the test instruction sequence 303 has finished executing 508. If the test instruction sequence has finished executing 508, the instruction microcontroller 108 may select, as the test instruction sequence 303, a new test instruction sequence.

Selecting a new test instruction sequence may comprise selecting the new test instruction sequence 510 as being mutually exclusive of the last executed test instruction sequence. Selecting the new test instruction may also comprise selecting the new test instruction sequence as at least partially overlapping with the last executed test instruction sequence. For example, selecting the new test instruction sequence may comprise incrementing or modifying a starting instruction address and selecting a predefined number of instructions beginning from that starting instruction address. Any of the one or more processor cores 102a-n identified as failing may also then be identified as passing and/or their states reset so that execution of the new test instructions sequence may begin.

If, at step 506, the slowest core is determined to match the failure signature, the instruction microcontroller may identify 512 the slowest core as failing instead of passing (and therefore excluded from future iterations of the passing processor cores). The method of FIG. 5 may then include determining 514 if each processor core is identified as failing. If not, the method of FIG. 5 may further comprise copying 516 a last passing save state (e.g., saved by the instruction microcontroller 108 at a time or cycle interval) from the slowest core into the one or more passing cores. The method of FIG. 5 may then return to identifying 502 from the passing processor cores (now excluding the previous slowest core that has failed), a slowest core.

If, at 514, it is determined that each processor core has failed, the method of FIG. 5 may further comprise determining the test instruction sequence (e.g., the test instruction sequence that, when executed, caused each of the processor cores match a failure signature) as a critical instruction sequence 308. The instruction microcontroller 108 may then update the database 110 to indicate the failure signature, the critical instruction sequence, one or more save states (e.g., a last passing save state for a last failing processor core 102a-n), etc. Thus, the instruction microcontroller 108 may replicate a failure by loading in a last passing save state for the last failing processor core 102a-n and executing the saved critical instruction sequence.

Figure 6:
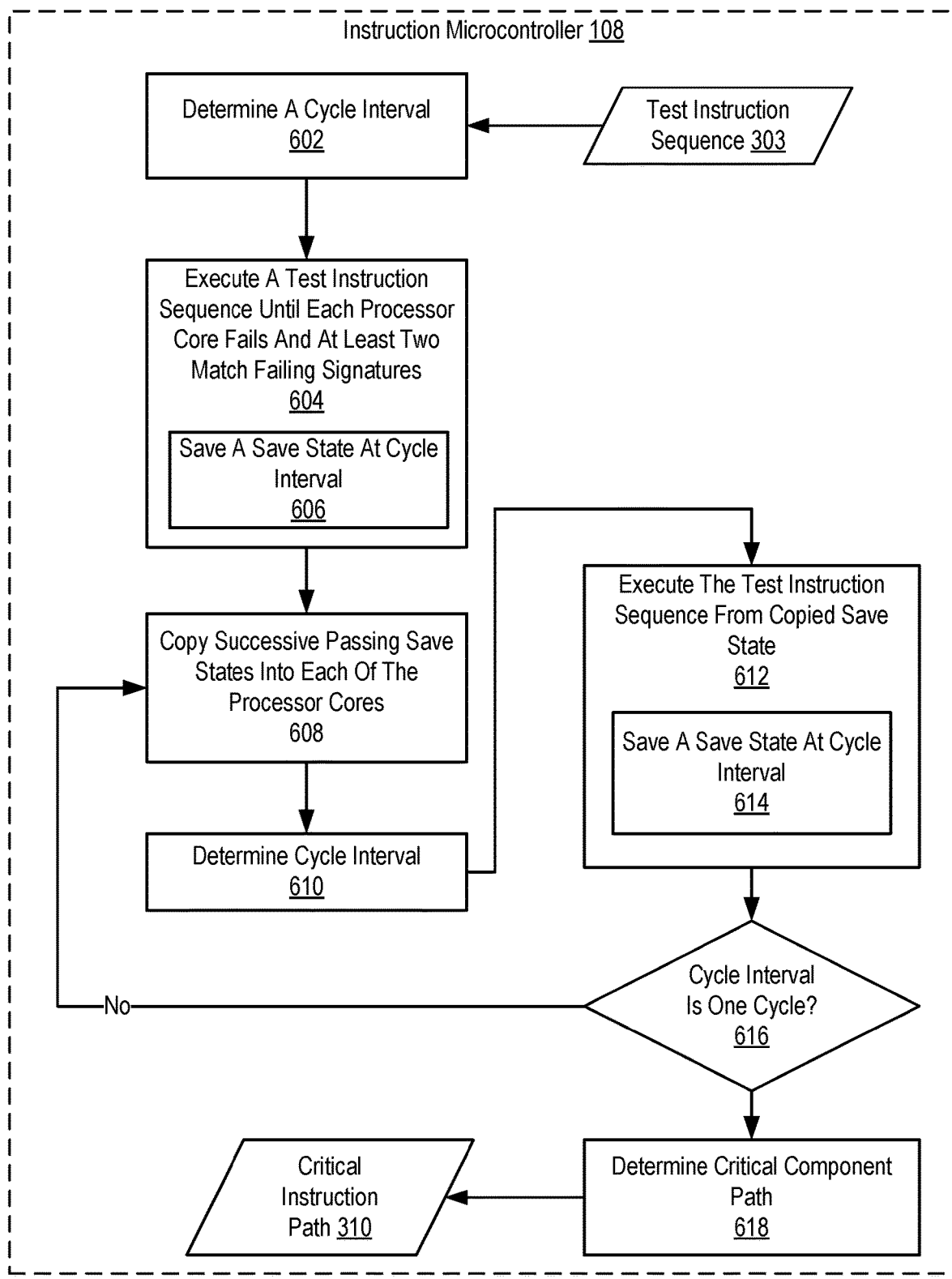
FIG. 6 is a flowchart of an example method for critical path failure analysis using hardware instruction injection.

For further explanation, FIG. 6 shows an example method for critical path failure analysis using hardware instruction injection. Particularly, FIG. 6 shows a method for performing a SPO analysis that includes determining 602 (e.g., by an instruction microcontroller 108) a cycle interval (e.g., a number of cycles). For example, assuming a test instruction sequence 303 of N instructions, the cycle interval may be determined to be N. The method of FIG. 6 further comprises executing 604 a test instruction sequence 303 until each processor core of a plurality of processor cores fails and at least two of the processor cores match failing signatures. Executing 604 the test instruction sequence may comprise saving 606, for each processor core, a respective state at the cycle interval. Executing the test instruction sequence 303 until each processor matches the failure signature may comprise executing multiple iterations of the test instruction sequence 303. The test instruction sequence 303 may comprise a critical instruction path as determined by an SLP analysis, or another test instruction sequence 303. If the test instruction sequence 303 finishes execution without each processor core failing and/or at least two of the processor cores matching failing signatures, the method of FIG. 6 would end, with subsequent iterations using a different test instruction sequence 303.

The method of FIG. 6 further comprises copying 608 successive passing save states into each of the processor cores. A successive passing save state comprises a save state for a highest number of executed cycles while the corresponding processor core is in a passing state (e.g., not matching a failure signature). For example, given four processor cores executing a test instruction sequence 303 with a cycle interval of N, assume a first processor core is failing at 8N cycles, a second processor core is failing at 6N cycles, a third processor core is failing at 3N cycles, and a fourth processor core is failing at N cycles. The successive passing save state would be the state at 7N cycles for the first processor core (e.g., the cycle count of the first failing save state minus the cycle interval). The successive passing save state (e.g., 7N cycles of the first processor core) would be copied into each of the processor cores.

The method of FIG. 6 may further comprise determining 610 the cycle interval (e.g., a new cycle interval). Determining the cycle interval may comprise scaling or dividing the previous cycle interval. For example, a new cycle interval may be determined as the previous cycle interval divided by a number of processor cores. The method of FIG. 6 may further comprise executing 612 the test instruction sequence from the copied save state. For example, where the last loaded save state corresponds to 7N cycles of the test instruction sequence 303, the test instruction sequence 303 would resume execution on each processor core from the 7N cycle point. Executing the test instruction sequence from the save state may also comprise saving 614 a save state at the cycle interval (e.g., the new cycle interval).

The test instruction sequence may be executed until a predefined number of processor cores match a failure signature (e.g., two or more). The method of FIG. 6 may further comprise determining 616 if the cycle interval is one cycle. If not, the method of FIG. 6 may return to copying 608 a last passing save state into each of the processor cores until the cycle interval converges to one cycle. Once the cycle interval converges to one cycle, the method of FIG. 6 may further comprise determining 618 a critical component path 310. For example, a last passing save state of one of the processor cores may be compared to a failing save state corresponding to the next cycle, the critical component path 310 may comprise a number of switches, latches, or paths of components that differ between the last passing save state and the next failing save state. For example, assume a four processor cores beginning execution of a test instruction sequence 303 from a save state beginning at M cycles. Further assume the first processor core failed at M+4 cycles, a second processor core failed at M+3 processor cores, a third processor core passed at M+2 cycles, and a fourth processor core passed at M+1 cycles. The critical component path may be determined based on a comparison of the save state of the second processor at M+3 cycles to the save state of the third processor at M+2 cycles (the last passing save state).

Figure 7:
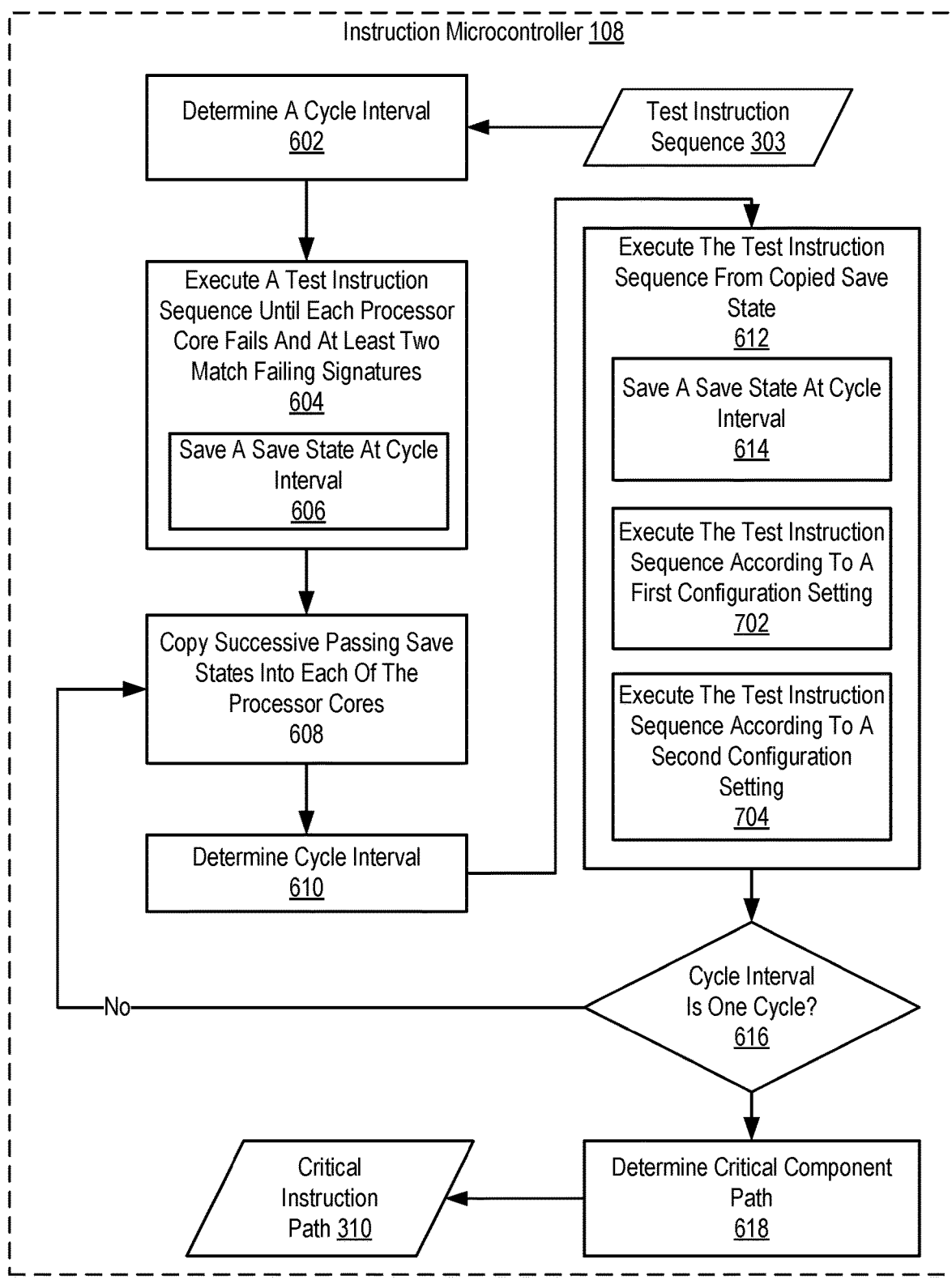
FIG. 7 is a flowchart of an example method for critical path failure analysis using hardware instruction injection.

For further explanation, FIG. 7 shows an example method for critical path failure analysis using hardware instruction injection that includes determining 602 a cycle interval; executing 604 a test instruction sequence until each process core matches a failure signature by saving 606 a save state at the cycle interval; copying 608 a last passing save state into each of the processor cores; determining 610 a cycle interval; executing 612 the test instruction sequence from the copied save state by saving 614 a save state at the cycle interval; determining 616 if the cycle interval is one cycle; if so, determining 618 the critical component path 610; and if not, returning to copying 608 the last passing save state into each of the processor cores.

FIG. 7 differs from FIG. 6 in that executing 612 the test instruction sequence from the copied save state comprises executing 702 the test instruction sequence according to a first configuration setting and executing 704 the test instructions sequence according to a second configuration setting. For example, the first configuration setting may comprise one or more default settings, one or more optimal or "golden" settings, or other settings. The second configuration setting may comprise one or more of a minimum voltage ($V_{min}$), a maximum frequency ($F_{max}$), or other setting. Thus, executing 702 the test instruction sequence according to a first configuration setting and executing 704 the test instructions sequence according to a second configuration setting may comprise saving save states at the cycle interval for each respective execution configuration. The first configuration settings and/or second configuration settings may correspond to close or similar matching failure signatures.

In view of the explanations set forth above, readers will recognize that the benefits of critical path failure analysis using hardware instruction injection according to embodiments of the present invention include:

Increased computational efficiency in finding critical instruction paths or critical component paths compared to existing approaches (e.g., binary searching of instruction cycle windows).

Reproducibility of cycle-reproducible failures due to capturing and storing last-passing save states and corresponding failure signatures and instruction paths.

Exemplary embodiments of the present invention are described largely in the context of a fully functional computer system for critical path failure analysis using hardware instruction injection. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of critical path failure analysis using hardware instruction injection, the method comprising:
providing, by an instruction microcontroller, to a plurality of processor cores, one or more test instruction sequences, wherein the instruction microcontroller is coupled to, for each of the plurality of processor cores: a first multiplexor providing an input to an instruction queue, and a second multiplexer receiving an input from the instruction queue and providing an output to an execution pathway;
performing, by the instruction microcontroller, based on one or more test instruction sequences, one or more of a scan-in last pass (SLP) analysis or a scan-in cycle offset (SCO) analysis; and
determining, based on one or more of the SLP analysis or the SCO analysis, one or more of a critical instruction sequence or a critical component path associated with the plurality of processor cores,
wherein the SLP analysis comprises determining the critical instruction sequence based on iteratively copying a last passing state of a failed processor core of the plurality of processor cores into the remaining processor cores until each of the plurality of processor cores have failed; and
wherein the SCO analysis comprises determining the critical component path based on comparing a last passing save state and a failing save state for a next cycle relative to the last passing save state.

2. The method of claim 1, wherein performing the SLP analysis comprises:
determining each of the plurality of processor cores as passing;
until each processor core of the plurality of processor cores is determined to be failing:
identifying, from the passing processor cores, a slowest core;
execute, on each of the passing processor cores, a test instruction sequence until the slowest core matches a failure signature or execution of the test instruction sequence is completed on each of the passing processor cores;
in response to the slowest core matching the failure signature:
identifying the slowest processing core as failing instead of passing;
copying, in response to one or more processor cores being identified as passing, a last-passing save state of the slowest core to the one or more processor cores identified as passing;
select, in response to the slowest core not matching the failure signature after execution of the test instruction sequence, another test instruction sequence as the test instruction sequence; and
wherein determining, based on one or more of the SLP analysis or the SCO analysis, one or more of the critical instruction sequence or the critical component path associated with the plurality of processor cores comprises determining, in response to each of the processor cores being identified as failing, the critical instruction sequence to be the test instruction sequence.

3. The method of claim 1, wherein performing the SCO analysis comprises:
determining a cycle interval;
executing, on each of the plurality of processor cores, a test instruction sequence until each of the plurality of processor cores matches a failure signature;
saving, at the cycle interval, a respective save state for each of the plurality of processor cores;
until the interval cycle comprises a single cycle:
copying a last passing save state into each of the plurality of processor cores;
determining, as the interval cycle, the interval cycle divided by the number of processor cores in the plurality of processor cores;

executing, from the last passing save state, on each of the plurality of processor cores, the test instruction sequence;

saving, at the cycle interval, the respective save state for each of the plurality of processor cores; and wherein determining, based on one or more of the SLP analysis or the SCO analysis, one or more of the critical instruction sequence or the critical component path associated with the plurality of processor cores comprises determining, based on a comparison between the last passing save state and a failing save state for a next cycle relative to the last passing save state, the critical component path.

4. The method of claim 3, wherein the test instruction sequence comprises the critical instruction sequence as determined by the SLP analysis.

5. The method of claim 3, wherein executing, from the last passing save state, on each of the plurality of processor cores, the test instruction sequence comprises:

executing, from the last passing save state, on each of the plurality of processor cores, the test instruction sequence, wherein each of the plurality of processor cores is configured to operate according to a first configuration setting; and executing, from the last passing save state, on each of the plurality of processor cores, the test instruction sequence, wherein each of the plurality of processor cores is configured to operate according to a second configuration setting comprising one or more of a voltage minimum setting or a maximum frequency setting.

6. The method of claim 3, wherein executing, from the last passing save state, on each of the plurality of processor cores, the test instruction sequence;

comprises one or more of providing, by the instruction microcontroller, one or more instructions to the instruction queue via the first multiplexer, or providing, by the instruction microcontroller, the one or more instructions to the execution pathway via the second multiplexer.

7. The method of claim 1 further comprising storing, in a database, as associated with a failure signature associated with the plurality of processor cores, the one or more of the critical instruction sequence or the critical component path.

8. An apparatus for critical path failure analysis using hardware instruction injection, the apparatus comprising a computer processor, a computer memory operatively coupled to the computer processor, the computer memory having disposed within it computer program instructions that, when executed by the computer processor, cause the apparatus to carry out the steps of:

providing, by an instruction microcontroller, to a plurality of processor cores, one or more test instruction sequences, wherein the instruction microcontroller is coupled to, for each of the plurality of processor cores: a first multiplexor providing an input to an instruction queue, and a second multiplexer receiving an input from the instruction queue and providing an output to an execution pathway;

performing, by the instruction microcontroller, based on one or more test instruction sequences, one or more of a scan-in last pass (SLP) analysis or a scan- in cycle offset (SCO) analysis; and determining, based on one or more of the SLP analysis or the SCO analysis, one or more of a critical instruction sequence or a critical component path associated with the plurality of processor cores, wherein the SLP analysis comprises determining the critical instruction sequence based on iteratively copying a last passing state of a failed processor core of the plurality of processor cores into the remaining processor cores until each of the plurality of processor cores have failed; and wherein the SCO analysis comprises determining the critical component path based on comparing a last passing save state and a failing save state for a next cycle relative to the last passing save state.

9. The apparatus of claim 8, wherein performing the SLP analysis comprises:

determining each of the plurality of processor cores as passing;

until each processor core of the plurality of processor cores is determined to be failing:

identifying, from the passing processor cores, a slowest core;

execute, on each of the passing processor cores, a test instruction sequence until the slowest core matches a failure signature or execution of the test instruction sequence is completed on each of the passing processor cores;

in response to the slowest core matching the failure signature:

identifying the slowest processing core as failing instead of passing;

copying, in response to one or more processor cores being identified as passing, a last-passing save state of the slowest core to the one or more processor cores identified as passing;

select, in response to the slowest core not matching the failure signature after execution of the test instruction sequence, another test instruction sequence as the test instruction sequence; and wherein determining, based on one or more of the SLP analysis or the SCO analysis, one or more of the critical instruction sequence or the critical component path associated with the plurality of processor cores comprises determining, in response to each of the processor cores being identified as failing, the critical instruction sequence to be the test instruction sequence.

10. The apparatus of claim 8, wherein performing the SCO analysis comprises:

determining a cycle interval;

executing, on each of the plurality of processor cores, a test instruction sequence until each of the plurality of processor cores matches a failure signature;

saving, at the cycle interval, a respective save state for each of the plurality of processor cores;

until the interval cycle comprises a single cycle:

copying a last passing save state into each of the plurality of processor cores;

determining, as the interval cycle, the interval cycle divided by the number of processor cores in the plurality of processor cores;

executing, from the last passing save state, on each of the plurality of processor cores, the test instruction sequence;

saving, at the cycle interval, the respective save state for each of the plurality of processor cores; and wherein determining, based on one or more of the SLP analysis or the SCO analysis, one or more of the critical instruction sequence or the critical component path associated with the plurality of processor cores comprises determining, based on a comparison between the last passing save state and a failing save state for a next cycle relative to the last passing save state, the critical component path.

11. The apparatus of claim 10, wherein the test instruction sequence comprises the critical instruction sequence as determined by the SLP analysis.

12. The apparatus of claim 10, wherein executing, from the last passing save state, on each of the plurality of processor cores, the test instruction sequence comprises:
executing, from the last passing save state, on each of the plurality of processor cores, the test instruction sequence, wherein each of the plurality of processor cores is configured to operate according to a first configuration setting; and
executing, from the last passing save state, on each of the plurality of processor cores, the test instruction sequence, wherein each of the plurality of processor cores is configured to operate according to a second configuration setting comprising one or more of a voltage minimum setting or a maximum frequency setting.

13. The apparatus of claim 10, wherein executing, from the last passing save state, on each of the plurality of processor cores, the test instruction sequence; comprises one or more of providing, by the instruction microcontroller, one or more instructions to the instruction queue via the first multiplexer, or providing, by the instruction microcontroller, the one or more instructions to the execution pathway via the second multiplexer.

14. The apparatus of claim 8, wherein the steps further comprise storing, in a database, as associated with a failure signature associated with the plurality of processor cores, the one or more of the critical instruction sequence or the critical component path.

15. A computer program product for critical path failure analysis using hardware instruction injection, the computer program product comprising a non-transitory computer readable storage medium with computer program instructions stored thereon that, when executed, cause a computer to carry out the steps of:
providing, by an instruction microcontroller, to a plurality of processor cores, one or more test instruction sequences, wherein the instruction microcontroller is coupled to, for each of the plurality of processor cores: a first multiplexor providing an input to an instruction queue, and a second multiplexor receiving an input from the instruction queue and providing an output to an execution pathway;
performing, by the instruction microcontroller, based on one or more test instruction sequences, one or more of a scan-in last pass (SLP) analysis or a scan- in cycle offset (SCO) analysis; and
determining, based on one or more of the SLP analysis or the SCO analysis, one or more of a critical instruction sequence or a critical component path associated with the plurality of processor cores,
wherein the SLP analysis comprises determining the critical instruction sequence based on iteratively copying a last passing state of a failed processor core of the plurality of processor cores into the remaining processor cores until each of the plurality of processor cores have failed; and
wherein the SCO analysis comprises determining the critical component path based on comparing a last passing save state and a failing save state for a next cycle relative to the last passing save state.

16. The computer program product of claim 15, wherein performing the SLP analysis comprises:
determining each of the plurality of processor cores as passing;
until each processor core of the plurality of processor cores is determined to be failing:
identifying, from the passing processor cores, a slowest core;
execute, on each of the passing processor cores, a test instruction sequence until the slowest core matches a failure signature or execution of the test instruction sequence is completed on each of the passing processor cores;
in response to the slowest core matching the failure signature:
identifying the slowest processing core as failing instead of passing;
copying, in response to one or more processor cores being identified as passing, a last-passing save state of the slowest core to the one or more processor cores identified as passing;
select, in response to the slowest core not matching the failure signature after execution of the test instruction sequence, another test instruction sequence as the test instruction sequence; and
wherein determining, based on one or more of the SLP analysis or the SCO analysis, one or more of the critical instruction sequence or the critical component path associated with the plurality of processor cores comprises determining, in response to each of the processor cores being identified as failing, the critical instruction sequence to be the test instruction sequence.

17. The computer program product of claim 15, wherein performing the SCO analysis comprises:
determining a cycle interval;
executing, on each of the plurality of processor cores, a test instruction sequence until each of the plurality of processor cores matches a failure signature;
saving, at the cycle interval, a respective save state for each of the plurality of processor cores;
until the interval cycle comprises a single cycle:
copying a last passing save state into each of the plurality of processor cores;
determining, as the interval cycle, the interval cycle divided by the number of processor cores in the plurality of processor cores;
executing, from the last passing save state, on each of the plurality of processor cores, the test instruction sequence;
saving, at the cycle interval, the respective save state for each of the plurality of processor cores; and
wherein determining, based on one or more of the SLP analysis or the SCO analysis, one or more of the critical instruction sequence or the critical component path associated with the plurality of processor cores comprises determining, based on a comparison between the last passing save state and a failing save state for a next cycle relative to the last passing save state, the critical component path.

18. The computer program product of claim 17, wherein the test instruction sequence comprises the critical instruction sequence as determined by the SLP analysis.

19. The computer program product of claim 17, wherein executing, from the last passing save state, on each of the plurality of processor cores, the test instruction sequence comprises:

executing, from the last passing save state, on each of the plurality of processor cores, the test instruction sequence, wherein each of the plurality of processor cores is configured to operate according to a first configuration setting; and executing, from the last passing save state, on each of the plurality of processor cores, the test instruction sequence, wherein each of the plurality of processor cores is configured to operate according to a second configuration setting comprising one or more of a voltage minimum setting or a maximum frequency setting.

20. The computer program product of claim 17, wherein executing, from the last passing save state, on each of the plurality of processor cores, the test instruction sequence; comprises one or more of providing, by the instruction microcontroller, one or more instructions to the instruction queue via the first multiplexer, or providing, by the instruction microcontroller, the one or more instructions to the execution pathway via the second multiplexer.

* * * * *